US012406600B2

(12) United States Patent
Passero et al.

(10) Patent No.: US 12,406,600 B2
(45) Date of Patent: Sep. 2, 2025

(54) APPLIANCE MODEL DISPLAY SYSTEM

(71) Applicant: Rheem Manufacturing Company, Atlanta, GA (US)

(72) Inventors: Abbigael Passero, Thousand Oaks, CA (US); Sergio Fabricio Duarte Rodriguez, Oxnard, CA (US); Augusta Gohil, Oxnard, CA (US); Justin Reyes, Santa Paula, CA (US); Amin Monfared, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 189 days.

(21) Appl. No.: 18/240,616

(22) Filed: Aug. 31, 2023

(65) Prior Publication Data

US 2024/0078938 A1 Mar. 7, 2024

Related U.S. Application Data

(60) Provisional application No. 63/403,142, filed on Sep. 1, 2022.

(51) Int. Cl.

| | |
|---|---|
| ***G09F 19/00*** | (2006.01) |
| ***G09F 3/00*** | (2006.01) |
| ***G09F 9/30*** | (2006.01) |
| ***G09F 19/12*** | (2006.01) |

(52) U.S. Cl.

CPC .......... *G09F 19/125* (2021.05); *G09F 3/0297* (2013.01); *G09F 9/30* (2013.01)

(58) Field of Classification Search

CPC ........ G09F 19/125; G09F 3/0297; G09F 9/30; A47F 5/0062; A47F 7/286; A47B 81/00; A63H 33/30; G09B 25/00; G09B 25/02

USPC .......................................................... 446/479

See application file for complete search history.

(56) References Cited

U.S. PATENT DOCUMENTS

| | | | | | |
|---|---|---|---|---|---|
| 2,321,339 | A | | 6/1943 | Wadsworth | |
| 2,801,754 | A | | 8/1957 | Dorfman | |
| 3,133,376 | A | * | 5/1964 | Orenstein | A63H 33/30 446/481 |
| 3,579,862 | A | * | 5/1971 | Ballen | G09B 1/10 273/156 |
| D296,630 | S | | 7/1988 | Renold et al. | |
| 5,239,491 | A | * | 8/1993 | Mucciaciaro | G04B 37/127 700/242 |

(Continued)

*Primary Examiner* — Cassandra Davis

(74) *Attorney, Agent, or Firm* — Eversheds Sutherland (US) LLP

(57) ABSTRACT

A product advertisement system includes (A) a plurality of miniature three-dimensional product models, wherein each product model (i) has a bottom surface, a top surface, and a side surface extending between the top and bottom surfaces; (ii) is a scaled replica of a full-size residential or commercial appliance; and (iii) has a hollow interior configuration with an opening in the bottom surface; and (B) a base configured to retain each product model in a single position thereon. Each product model is manually removable from and replaceable onto the base. The opening in the bottom surface of each product model has a unique shape, and the base includes projections that correspond to each of the openings, with each projection being sized and shaped to matingly engage with a single one of the openings of the product models to retain each product model in its single position on the base.

20 Claims, 8 Drawing Sheets

(56) References Cited

U.S. PATENT DOCUMENTS

| | | | |
|---|---|---|---|
| D507,431 | S | 7/2005 | Goth |
| D543,383 | S | 5/2007 | Edison et al. |
| D555,936 | S | 11/2007 | King |
| D637,016 | S | 5/2011 | Pohl |
| D813,575 | S | 3/2018 | Kraemer |
| D909,100 | S | 2/2021 | Joseph |
| D962,681 | S | 9/2022 | Lou |
| D977,308 | S | 2/2023 | Chen |
| D990,206 | S | 6/2023 | Cheng |
| D996,098 | S | 8/2023 | Goldstein et al. |

* cited by examiner

APPLIANCE MODEL DISPLAY SYSTEM

CROSS-REFERENCE TO RELATED APPLICATIONS

This application claims priority to and benefit of U.S. Provisional Patent Application No. 63/403,142, filed Sep. 1, 2022, which is incorporated herein by reference.

FIELD OF THE INVENTION

This disclosure is generally in the field of display models used in product advertising, and more particularly to display systems for small-scale replicas of products, such as appliances.

BACKGROUND

The use of conventional advertising brochures and displays for products in retail and distribution stores may be limited by insufficient space available in these locations. Such space challenges may be more acute for relatively larger products and/or extensive product lines. In addition, there is a continual need for innovative approaches to attract potential customers and distinguish advertising displays from those of competitors.

BRIEF DESCRIPTION OF THE DRAWINGS

The detailed description is set forth with reference to the accompanying drawings. In some instances, the use of the same reference numerals may indicate similar or identical items. Various embodiments may utilize elements and/or components other than those illustrated in the drawings, and some elements and/or components may not be present in various embodiments. Throughout this disclosure, depending on the context, singular and plural terminology may be used interchangeably.

DETAILED DESCRIPTION

Figure 1A:
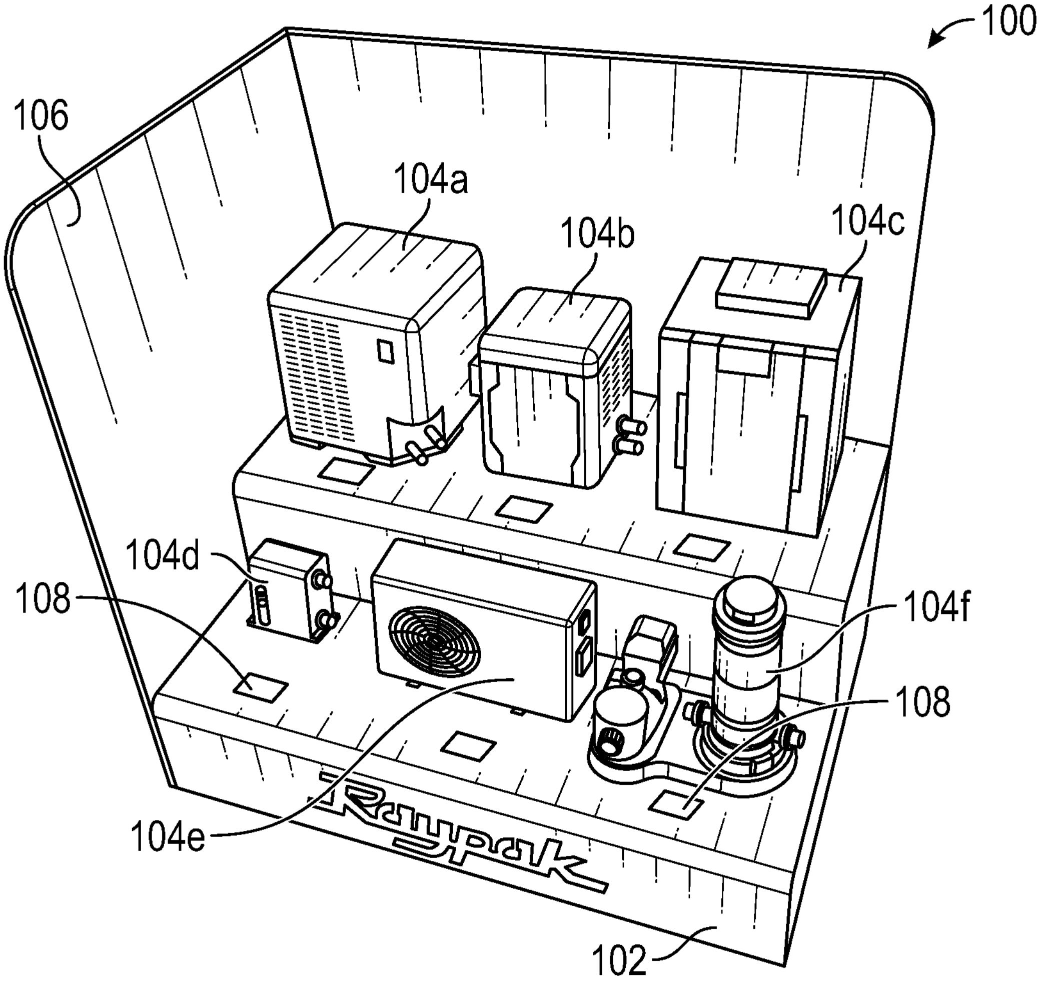
FIG. 1A is a perspective view of a product advertisement system according to one embodiment of the present disclosure.

A product advertisement system has been developed. In some embodiments, the system includes (A) a plurality of miniature three-dimensional product models, wherein each of the plurality of miniature three-dimensional product models (i) has a bottom surface, a top surface, and at least one side surface extending between the bottom surface and the top surface; (ii) is a scaled replica of a full-size residential or commercial appliance; and (iii) has a hollow interior configuration with an opening in the bottom surface; and (B) a base configured to retain each of the plurality of miniature three-dimensional product models in a single position thereon, each of the plurality of miniature three-dimensional product models being manually removable from and replaceable onto the base, wherein the opening in the bottom surface of each of the plurality of miniature three-dimensional product models has a unique shape, and the base comprises a plurality of projections that correspond to each of the openings, with each of the plurality of projections being sized and shaped to matingly engage with a single one of the openings of the plurality of miniature three-dimensional product models to retain each miniature three-dimensional product model in its single position on the base.

In some other embodiments, the product advertisement system includes (A) a plurality of miniature three-dimensional product models, wherein each of the plurality of miniature three-dimensional product models (i) has a bottom surface, a top surface, and at least one side surface extending between the bottom surface and the top surface; and (ii) is a scaled replica of a full-size residential or commercial appliance; and (iii) has at least one projection extending from the bottom surface; and (B) a base configured to retain each of the plurality of miniature three-dimensional product models in a single position thereon, each of the plurality of miniature three-dimensional product models being manually removable from and replaceable onto the base, wherein the base has a recess corresponding to the at least one projection of each of the plurality of miniature three-dimensional product models, each recess having a unique shape and/or size, the at least one projection of each of the plurality of miniature three-dimensional product models being sized and shaped to matingly engage with a single one of the recesses in the base to retain each miniature three-dimensional product model in its single position on the base.

In some embodiments, the full-size residential or commercial appliance is selected from pool and spa heaters, heat pumps, filter pumps, water pumps, indirect heat exchangers, boilers, and water heaters (including but not limited to residential or commercial waters, as well as both tanked and tankless water heaters). The miniature three-dimensional product model can be a replica scaled down to any size suitable for display and manual handling by a person. The product models in a particular product advertisement system may be the same scale as one another or a different scale from that of other products in the system.

An example of product advertisement system in accordance with the present disclosure is described in greater detail with reference to FIG. 1A to FIG. 4.

Figure 1B:
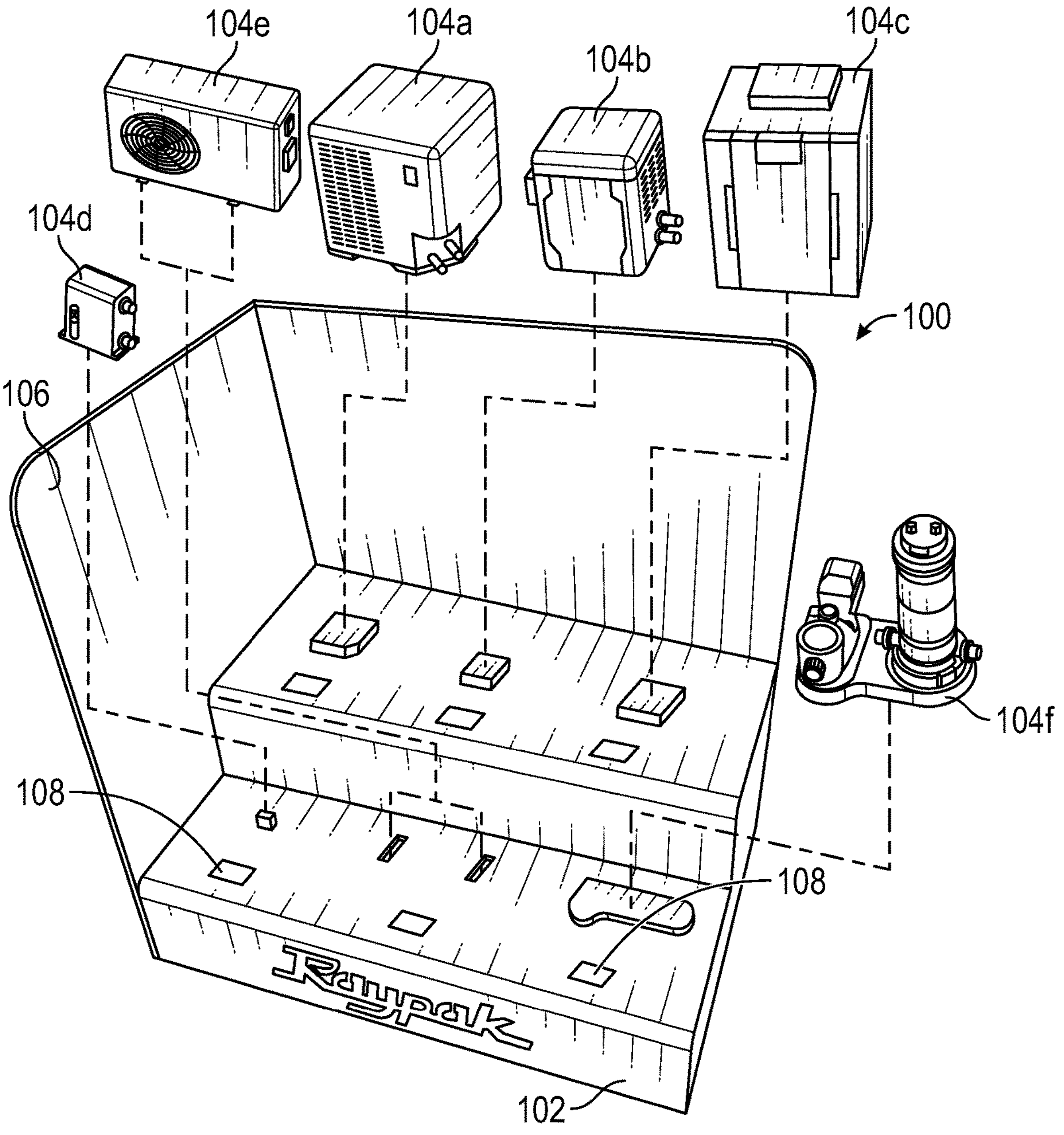
FIG. 1B is an exploded, perspective view of a product advertisement system according to the embodiment of the present disclosure shown in FIG. 1A.

FIGS. 1A-1B show a product advertisement system 100 that includes a base 102, six miniature three-dimensional product models 104*a*, 104*b*, 104*c*, 104*d*, 104*e*, and 104*f*, and a background wall 106. The base 102 has an upper tier and a lower tier, wherein the upper tier displays product models 104*a*, 104*b*, 104*c*, and the lower tier displays product models 104*d*, 104*e*, and 104*f*. In FIG. 1A, each product model is retained in its single nested position on the base 102. In FIG. 1B, each product model is shown removed from its single nested position on the base 102. The models are configured to be easily manually lifted from and replaced onto their nested positions on the base.

The miniature three-dimensional product models 104*a*, 104*b*, 104*c*, 104*d*, 104*e*, and 104*f*, are scaled replicas of a full-size pool or spa appliance, including heat pumps, variable speed water pumps, cartridge filters, residential pool and spa heater, and commercial pool heaters. In other embodiments, the product models are other types of residential and commercial appliances, including HVAC equipment and household (e.g., kitchen) appliances. In some embodiments, the miniature three-dimensional product models are replicas that are scaled from 2% to 10% of the sizes of the actual products. In some preferred embodiments, the model scales range from 3% to 6% of the sizes of the actual products.

The background wall 106 is configured for placement adjacent to the base 102 and is sized to extend above the plurality of miniature three-dimensional product models on the base. The background wall may be removably attached to the base and may include various product images and/or description.

In certain embodiments, the base 102 includes a QR code 108 proximate to the nesting position of each of the miniature three-dimensional product models on the base, which is visible when the models are in the nested position. In other embodiments, a barcode or other machine-readable code may be used in place of, or in combination with, the QR code. In some embodiments, each QR code 108 is unique and provides a link to a website page with further information about the product of which the model is a replica. Such information may include product specifications, pricing, availability, etc.

Figure 2:
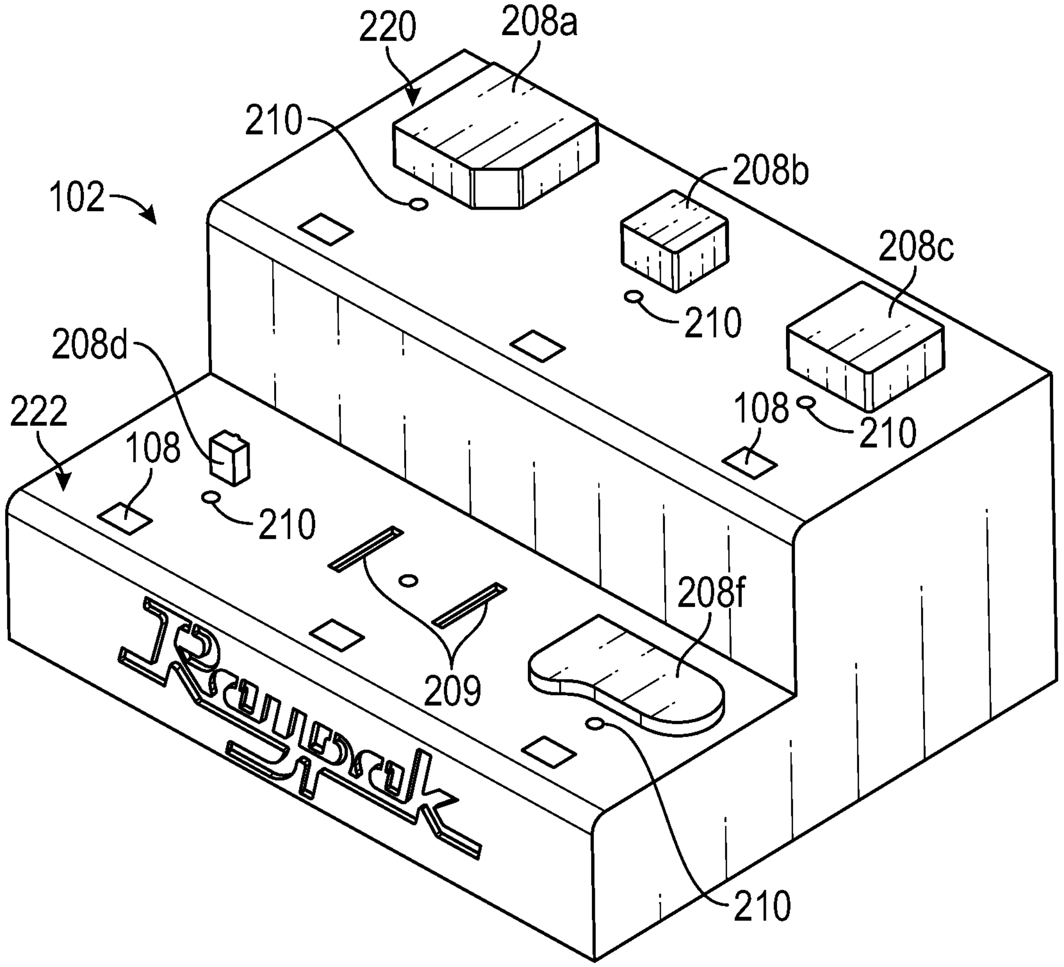
FIG. 2 is a perspective view of a base of a product advertisement system according to one embodiment of the present disclosure.

FIG. 2 shows base 102 in further detail. The base 102 include upper tier surface 220 from which projections 208*a*, 208*b*, and 208*c* extend. The base 102 also include lower tier surface 222 from which projections 208*d* and 208*f* extend. Each of projections 208*a*, 208*b*, 208*c*, 208*d*, and 208*f* has unique size and/or shape that corresponds to an opening in the bottom surface of one of the product models, to matingly engage with a single one of the openings of the miniature three-dimensional product models. In this way, the base 102 is configured to retain each of product models 104*a*, 104*b*, 104*c*, 104*d*, and 104*f* in a single position in the base 102, with each of these product models being manually removable from and replaceable onto the base 102.

FIG. 2 also shows that the lower tier surface 222 includes a pair of slots 209. These slots correspond to a pair of projections extending from a bottom surface of one of the product models, in this case product model 104*e*. In various embodiments, the base may include only openings, only projections, or a combination of openings and projections.

FIG. 2 also shows a plurality of sensors 210 located in the base 102. The sensors 210 are configured to detect removal of each of the miniature three-dimensional product models from its position on the base. The sensors also may be further configured to detect replacement of each of the miniature three-dimensional product models onto its position on the base. Each sensor 210 may be associate with each of the product models, for example, in a location on a surface of the base in an area about, e.g., under, each of the product models, or on/in one of the projections. Alternative, the sensor may be located in each of the plurality of miniature three-dimensional product models. Any suitable sensor known in the art may be adapted for use in the advertising system. For example, the sensor may detect a change in pressure, light, electrical or magnetic field, that occurs when as a product model is moved into and out of its nesting position on the base. Upon detecting removal of a product model from its nesting position on the base, the sensor may send a signal to trigger actuation of another feature of the advertising system. For example, the advertising system may further include a video display and/or a speaker; memory configured to store computer-executable instructions; and a computer processor configured to access the memory and execute the computer-executable instructions to: determine, based a signal from a sensor, that one of the miniature three-dimensional product models has been removed from its nesting position on the base; and then to display motion or still images, on the video display, and/or to play an audio recording through the speaker, providing information, for example, related to the product corresponding to the particular product model removed.

Figure 5:
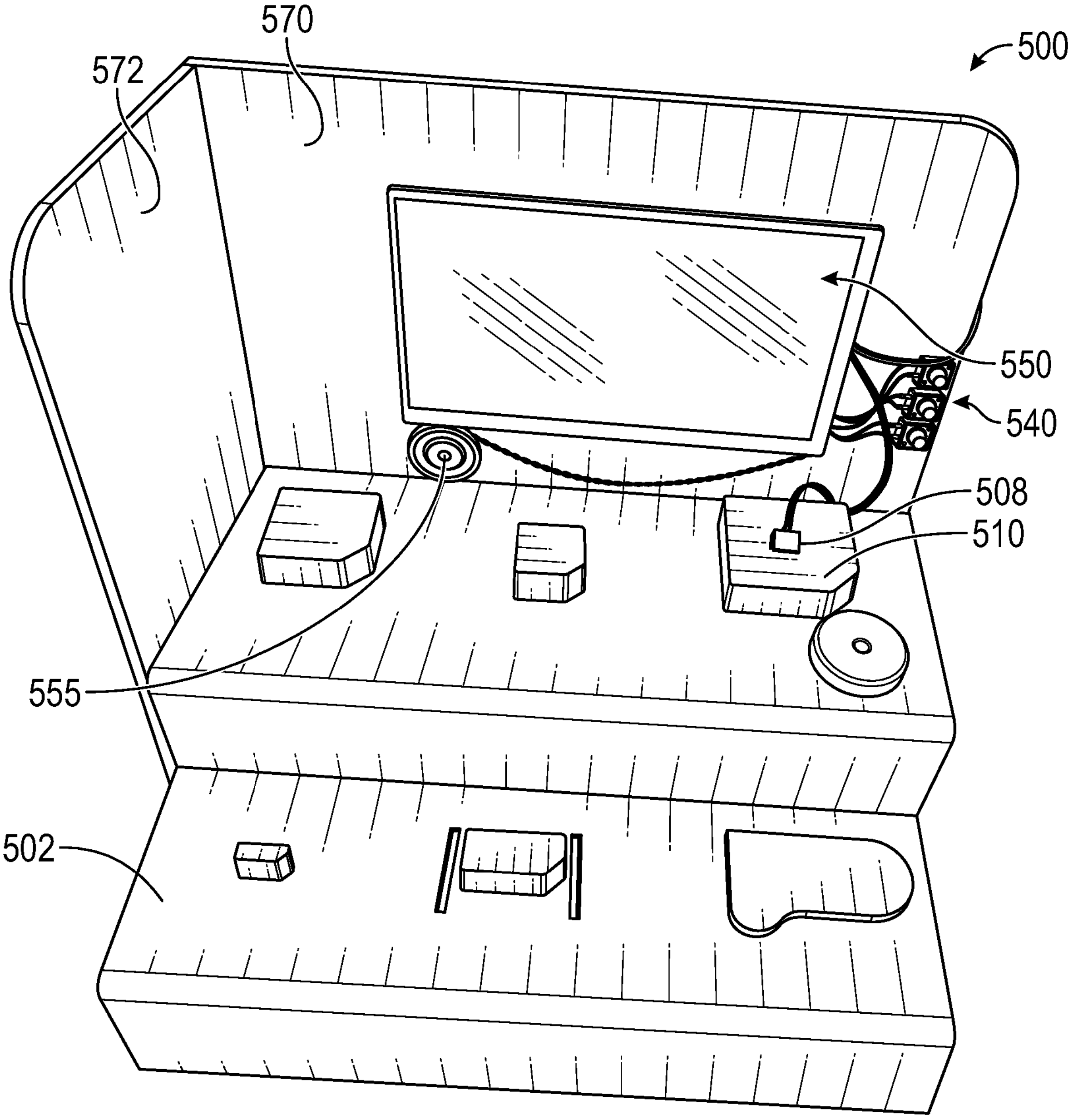
FIG. 5 is a perspective view of a product advertisement system according to another embodiment of the present disclosure, which includes a video display and a product model sensor.

FIG. 5 illustrates one embodiment of an advertising system 500, which has a base 502 and a sensor 508 located on projection 510. The product models are omitted from this image. Sensor 508 is operatively connected to controller and memory electronics 540, which in turn are operatively connected to video display 550 and speaker 555, which are mounted on a background wall 570. Additional advertising images and/or text can be provided on background walls 570 and 572. With a product model removed from its nesting position on projection 510, the sensor 508 triggers, via the controller and memory electronics 540, the video display 550 and speaker to play one or more pre-recorded audiovisual messages. The sensor, controller, video display, and speaker components and modules are those known in the art, and can be operably connected with wired and/or wireless connections known in the art, and powered with appropriate electrical power sources, for example rechargeable batteries and/or power cables connectable to conventional power outlets.

Figure 3A:
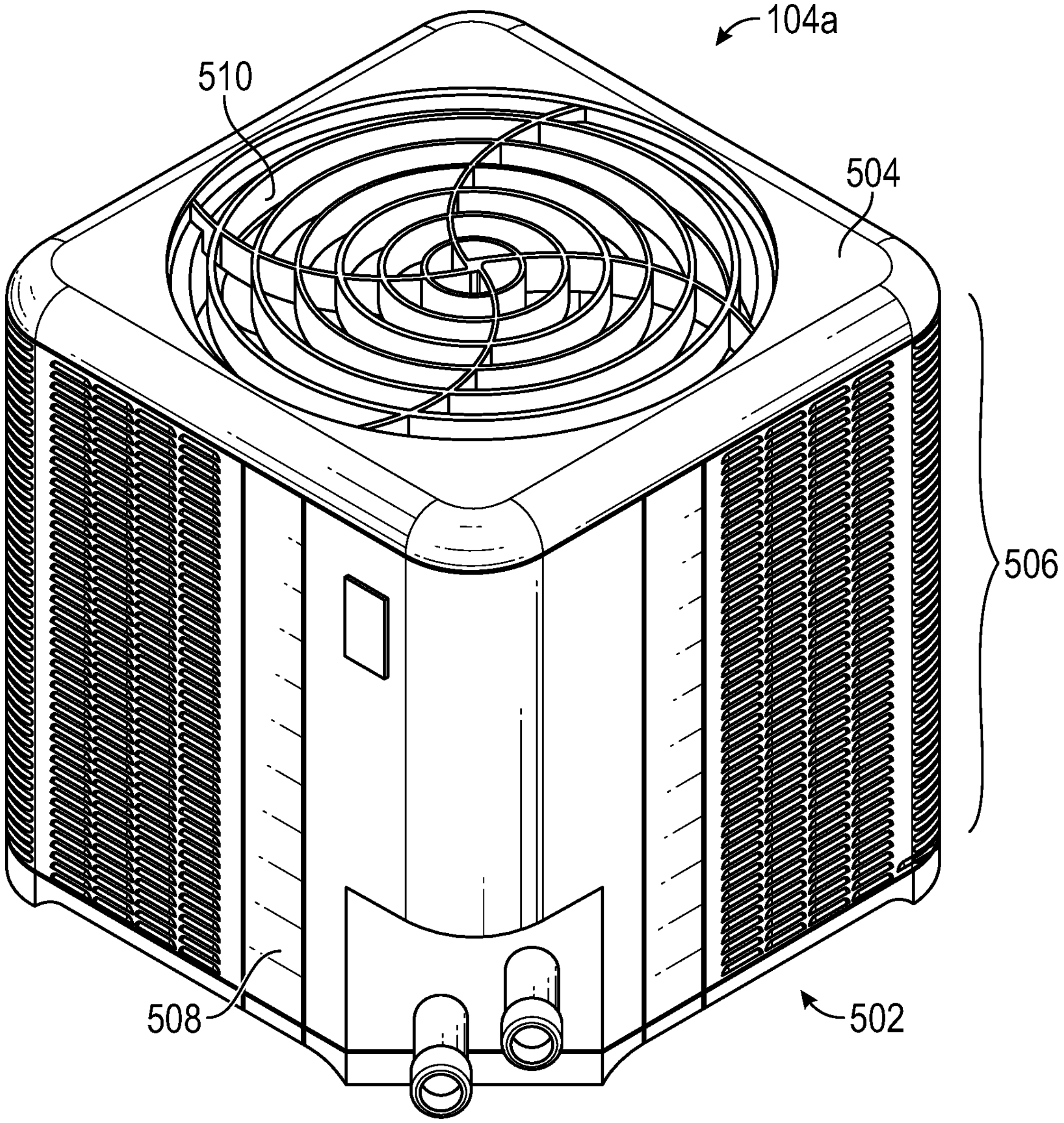
FIG. 3A is a top, perspective view of a miniature three-dimensional product model of one appliance according to one embodiment of the present disclosure.
Figure 3B:
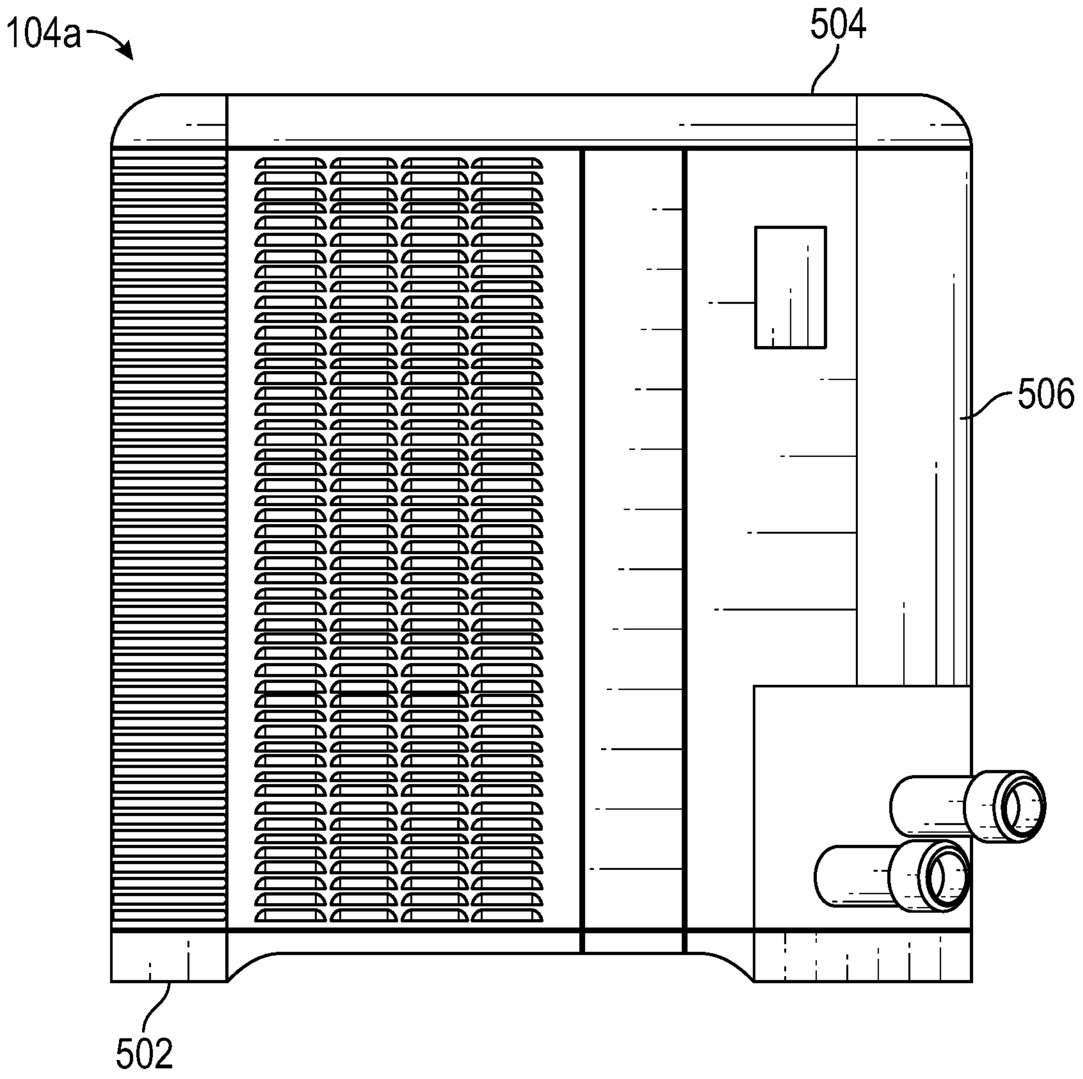
FIG. 3B is a side view of the miniature three-dimensional product model shown in FIG. 3A.
Figure 3C:
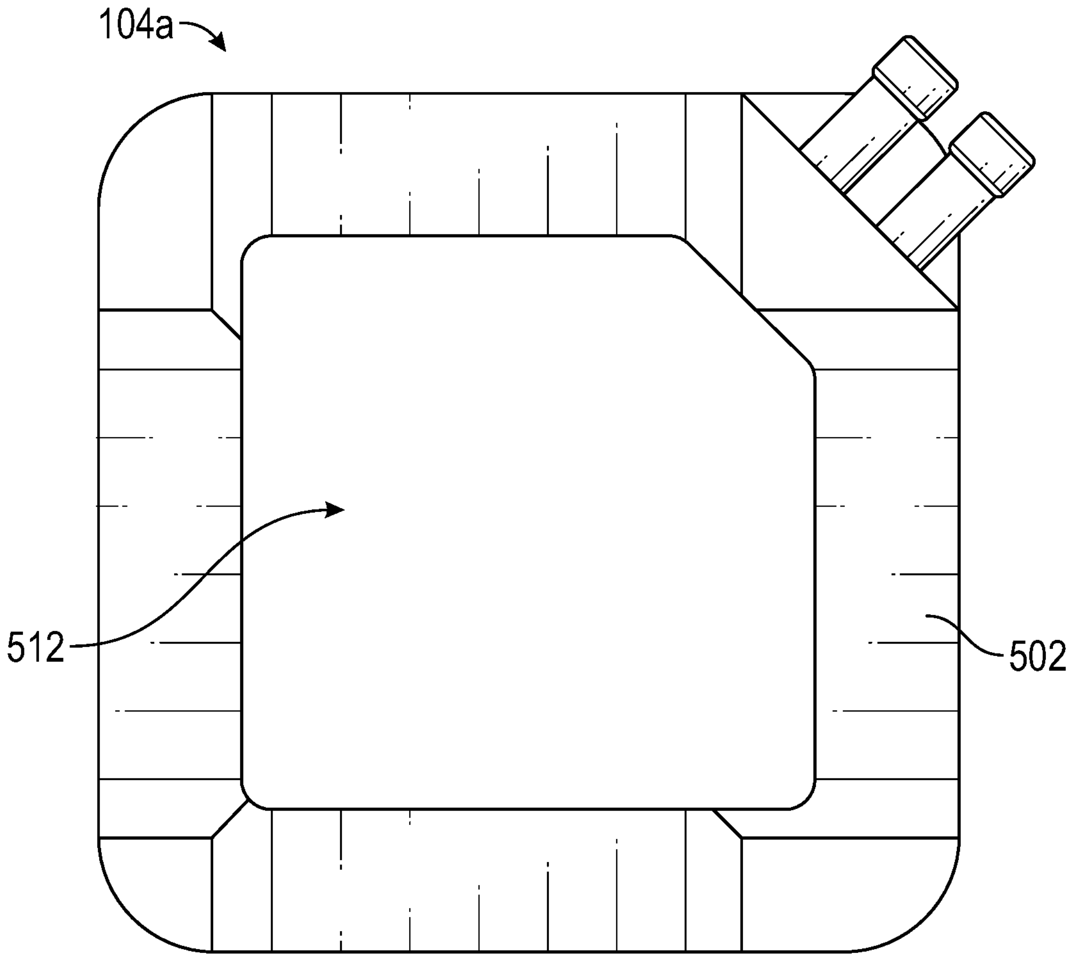
FIG. 3C is a bottom view of the miniature three-dimensional product model shown in FIG. 3A.

FIGS. 3A-3C show one embodiment of a miniature three-dimensional product model 104*a*. The product model 104*a* has a bottom surface 502, a top surface 504, and a side surface 506 extending between the bottom surface and the top surface. The product model 104*a* has an opening 512 in the bottom surface 502. The product model 104*a* has a body 508 having hollow interior configuration that is accessible via the opening 512. As used herein, the term "hollow" refers to the model having an interior configuration in which an open volume is defined within the side surface of the model. In some embodiments, the open volume may define the opening in the bottom surface. For example, in certain embodiments, the hollow interior configuration includes the opening and additional volume extending between the bottom surface and the top surface of the model. In some embodiments, the product model consists of a single monolithic structure. In some other embodiments, the product model may include two or more components. For example, product model 104*a* may be constructed by (i) making the body 508, e.g., by 3D printing; (ii) making fan grill 510, and then (iii) using an adhesive to attach fan grill 510 to body 508.

Figure 4:
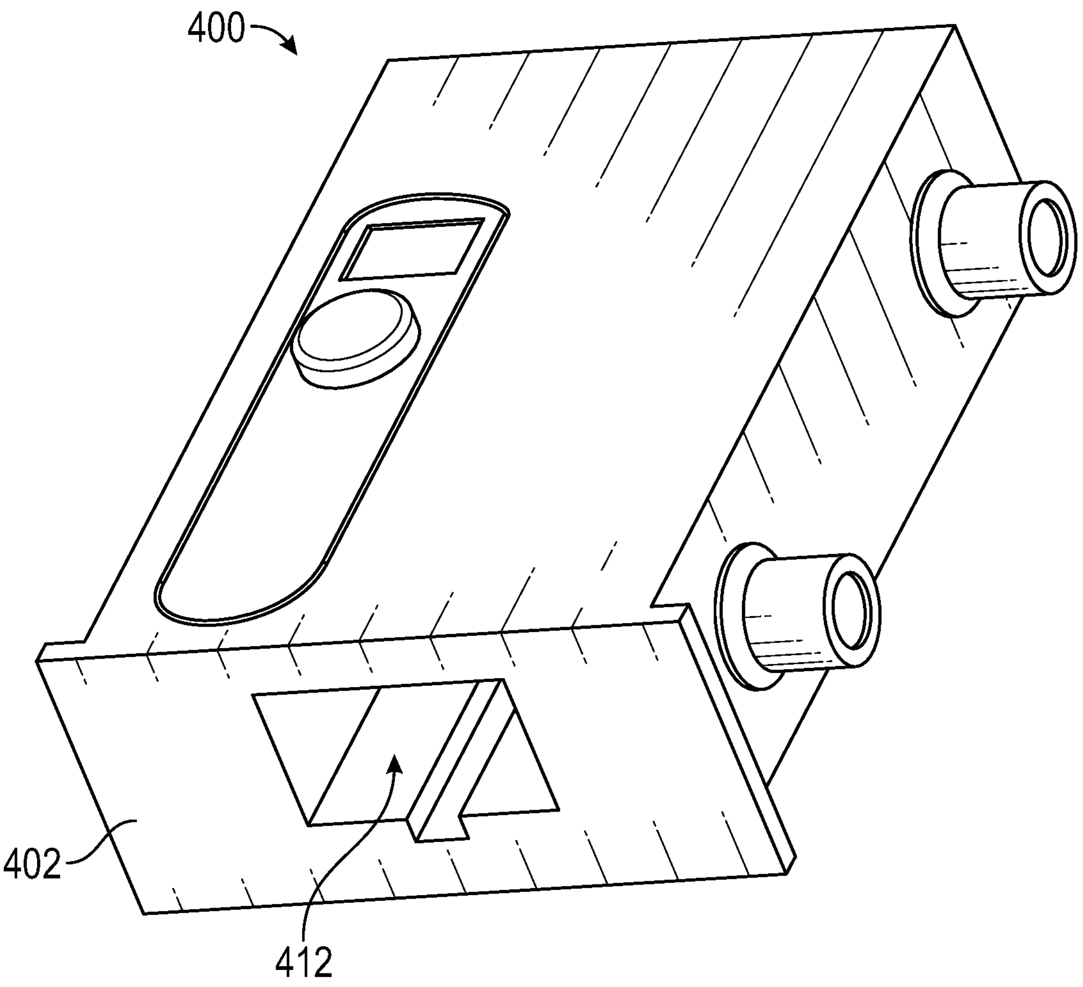
FIG. 4 is a bottom, perspective view of another miniature three-dimensional product model of an appliance according to another embodiment of the present disclosure.

FIG. 4 shows another embodiment of a miniature three-dimensional product model 400. The bottom surface 402 includes an opening 412 which is configured to matingly engage with a single projection on a base of product advertising system as described herein. In this case, the opening 412 has a keyhole design.

In other embodiments, the projections and recesses of the base and the respective openings and projections may have a variety of other peripheral shapes, such as square, rectangular, or circular, and may have a keyhole notches, chamfered or beveled corners, and the like. Essentially any suitable geometry may be used, so long as the openings/projections in of each of the miniature three-dimensional product models has unique shape and/or size to provide a single nesting location and nesting orientation for each product model on the base.

The miniature three-dimensional product models may be produced by any suitable method. In some embodiments, the models are produced by a process comprising molding and/or additive manufacturing, such as 3D printing, e.g., polymeric materials known in the art of 3D printing. In some embodiments, the product model has at least one sidewall that defines the at least one side surface. In some embodiments, the at least one sidewall has a thickness of at least 0.05 inches (1.3 mm) which was found to provide the product models with sufficient rigidity and good features resolution. In some embodiments, the side walls have a thickness from about 0.05 inches (1.3 mm) to about 0.5 inches (13 mm). The walls of the product models may be driven by the size of the boss, or projection, on which the product model nests.

In some embodiments, the top surface and the at least one side surface of each miniature three-dimensional product models is finished by a vapor smoothing process, as known in the art.

It should be apparent that the foregoing relates only to certain embodiments of the present disclosure and that numerous changes and modifications may be made herein by one of ordinary skill in the art without departing from the general spirit and scope of the disclosure.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A product advertisement system comprising:

a plurality of miniature three-dimensional product models, wherein each of the plurality of miniature three-dimensional product models (i) has a bottom surface, a top surface, and at least one side surface extending between the bottom surface and the top surface; (ii) is a scaled replica of a full-size residential or commercial appliance; and (iii) has a hollow interior configuration with an opening in the bottom surface; and a base configured to retain each of the plurality of miniature three-dimensional product models in a single position thereon, each of the plurality of miniature three-dimensional product models being manually removable from and replaceable onto the base, wherein the opening in the bottom surface of each of the plurality of miniature three-dimensional product models has a unique shape, and the base comprises a plurality of projections that correspond to each of the openings, with each of the plurality of projections being sized and shaped to matingly engage with a single one of the openings of the plurality of miniature three-dimensional product models to retain each miniature three-dimensional product model in its single position on the base, wherein the system further comprises one or more sensors located in the base and/or in the plurality of miniature three-dimensional product models, wherein the one or more sensors are configured to detect removal of each of the plurality of miniature three-dimensional product models from its position on the base.

2. The product advertisement system of claim 1, wherein the base comprises an upper tier and a lower tier, and a first portion of the plurality of projections is located on the upper tier and the remainder of the plurality of projections is located on the lower tier.

3. The product advertisement system of claim 2, wherein the upper tier is configured to display a single row of three or more of the plurality of miniature three-dimensional product models.

4. The product advertisement system of claim 2, wherein the lower tier is configured to display a single row of three or more of the plurality of miniature three-dimensional product models.

5. The product advertisement system of claim 1, wherein the plurality of miniature three-dimensional product models are produced by a process comprising molding and/or additive manufacturing.

6. The product advertisement system of claim 5, wherein the plurality of miniature three-dimensional product models are produced by a process comprising 3D printing.

7. The product advertisement system of claim 5, wherein each of the plurality of miniature three-dimensional product models is a monolithic structure or consists of only two components secured to one another.

8. The product advertisement system of claim 5, wherein the top surface and the at least one side surface of each of the plurality of miniature three-dimensional product models has been finished by a vapor smoothing process.

9. The product advertisement system of claim 1, wherein the one or more sensors are further configured to detect replacement of each of the plurality of miniature three-dimensional product models onto its position on the base.

10. The product advertisement system of claim 1, further comprising:

a video display;

memory configured to store computer-executable instructions; and at least one computer processor configured to access the memory and execute the computer-executable instructions to:

determine, based a signal from the one or more sensors, that one of the plurality of miniature three-dimensional product models has been removed from its position on the base; and display motion or still images, on the video display, corresponding to the miniature three-dimensional product models that has been determined to have been removed from its position on the base.

11. The product advertisement system of claim 1, wherein the base further comprises a barcode, a QR code, or other machine-readable code disposed proximate to the position of each of the plurality of miniature three-dimensional product models on the base.

12. The product advertisement system of claim 1, further comprising a background wall configured for placement adjacent to the base and sized to extend above the plurality of miniature three-dimensional product models on the base.

13. The product advertisement system of claim 1, wherein the full-size residential or commercial appliance is selected from pool and spa heaters, heat pumps, filter pumps, water pumps, indirect heat exchangers, boilers, and water heaters.

14. A product advertisement system comprising:

a plurality of miniature three-dimensional product models, wherein each of the plurality of miniature three-dimensional product models (i) has a bottom surface, a top surface, and at least one side surface extending between the bottom surface and the top surface; and (ii) is a scaled replica of a full-size residential or commercial appliance; and (iii) has at least one projection extending from the bottom surface; and a base configured to retain each of the plurality of miniature three-dimensional product models in a single position thereon, each of the plurality of miniature three-dimensional product models being manually removable from and replaceable onto the base, wherein the base has a recess corresponding to the at least one projection of each of the plurality of miniature three-dimensional product models, each recess having a unique shape and/or size, the at least one projection of each of the plurality of miniature three-dimensional product models being sized and shaped to matingly engage with a single one of the recesses in the base to retain each miniature three-dimensional product model in its single position on the base, wherein the system further comprises one or more sensors located in the base and/or in the plurality of miniature three-dimensional product models, wherein the one or more sensors are configured to detect removal of each of the plurality of miniature three-dimensional product models from its position on the base.

15. The product advertisement system of claim 14, wherein the base comprises an upper tier and a lower tier, and a first portion of the plurality of projections is located on the upper tier and the remainder of the plurality of projections is located on the lower tier.

16. The product advertisement system of claim 14, wherein the one or more sensors are further configured to detect replacement of each of the plurality of miniature three-dimensional product models onto its position on the base.

17. The product advertisement system of claim 14, wherein the base further comprises a barcode, a QR code, or other machine-readable code disposed proximate to the position of each of the plurality of miniature three-dimensional product models on the base.

18. The product advertisement system of claim 14, wherein the full-size residential or commercial appliance is selected from pool and spa heaters, heat pumps, filter pumps, water pumps, indirect heat exchangers, boilers, and water heaters.

19. A model display system comprising:

a plurality of miniature three-dimensional product models, wherein each of the plurality of miniature three-dimensional product models (i) has a bottom surface, a top surface, and at least one side surface extending between the bottom surface and the top surface; (ii) is a scaled replica of a full-size residential or commercial appliance; and (iii) has a hollow interior configuration with an opening in the bottom surface;

a base comprising an upper tier and a lower tier, each of the upper and lower tiers being configured to retain half of the plurality of miniature three-dimensional product models in a single position thereon, each of the plurality of miniature three-dimensional product models being manually removable from and replaceable onto the base; and one or more sensors configured to detect removal of each of the plurality of miniature three-dimensional product models from its position on the base, wherein the opening in the bottom surface of each of the plurality of miniature three-dimensional product models has a unique shape, and the base comprises a plurality of projections that correspond to each of the openings, with each of the plurality of projections being sized and shaped to matingly engage with a single one of the openings of the plurality of miniature three-dimensional product models to retain each miniature three-dimensional product model in its single position on the base.

20. The model display system of claim 19, further comprising:

a video display;

memory configured to store computer-executable instructions; and at least one computer processor configured to access the memory and execute the computer-executable instructions to:

determine, based a signal from the one or more sensors, that one of the plurality of miniature three-dimensional product models has been removed from its position on the base; and display motion or still images, on the video display, corresponding to the miniature three-dimensional product models that has been determined to have been removed from its position on the base.

* * * * *